June 20, 1967
R. J. H. CLERCX
3,326,535
METHODS AND EQUIPMENT FOR PREPARING MORTAR OR CONCRETE
Filed Feb. 17, 1966
2 Sheets-Sheet 1
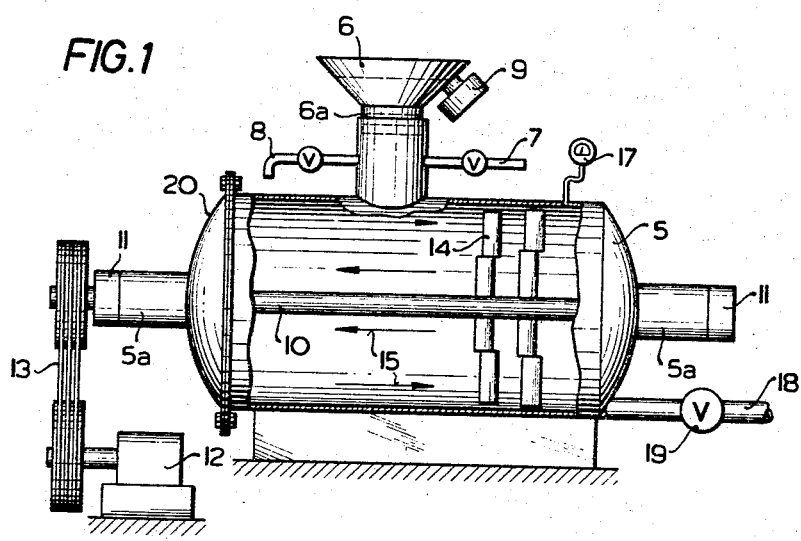
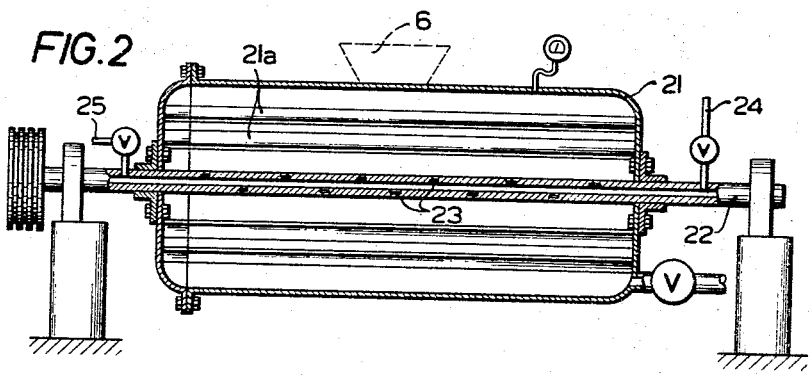
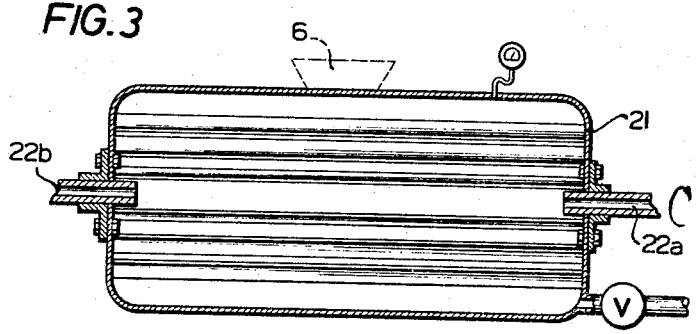
INVENTOR
ROGER JOHANNUS HENRICUS CLERCX
BY
*Abraham A. Saffitz*
ATTORNEY

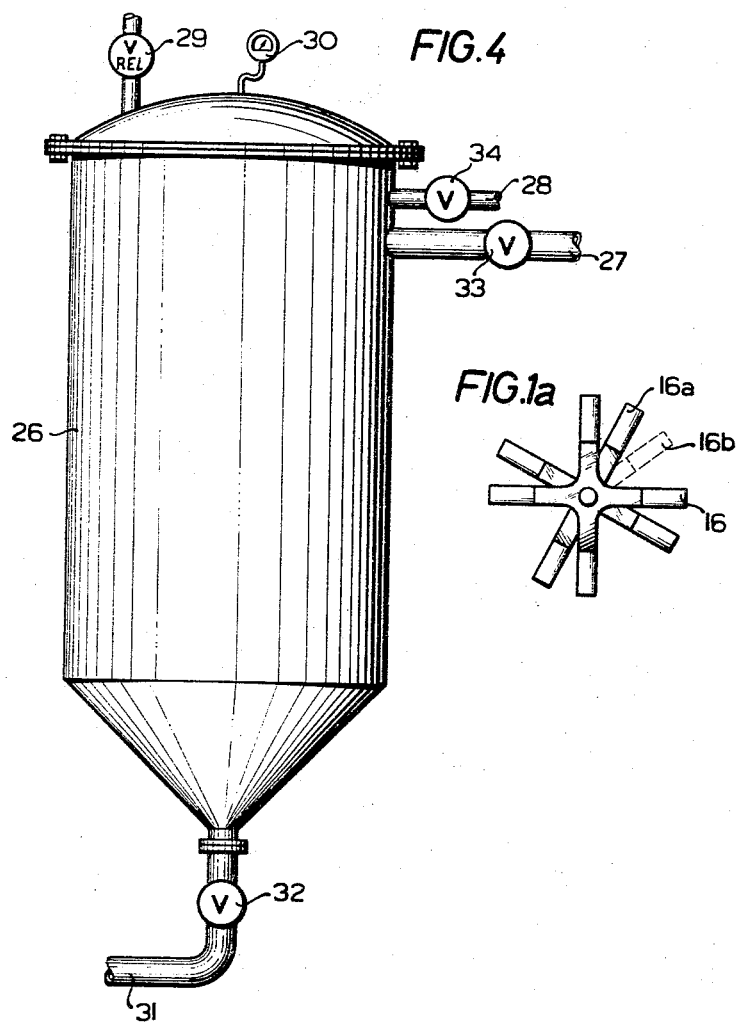

United States Patent Office 3,326,535
Patented June 20, 1967

3,326,535
METHODS AND EQUIPMENT FOR PREPARING MORTAR OR CONCRETE
Roger Johannus Henricus Clercx, Anjerstrasse 44, Drunen, Netherlands
Filed Feb. 17, 1966, Ser. No. 528,295
Claims priority, application Germany, Feb. 19, 1965, C 35,130; Mar. 4, 1965, C 35,220; Aug. 23, 1965, C 36,709
13 Claims. (Cl. 259—147)

The present invention relates to a novel method and apparatus for mixing gas-entrained fluid cement which can be piped under hydraulic or air pressure for discharge to the site of use.

The mortar composition which is subjected to the gas-incorporating, fluid mixing and pneumatic conveying procedures in the new apparatus of the present invention is prepared by mixing the standard cementitious ingredient, such as Portland-type cement, aluminous cement, pozzolanic cement and the like, with a lesser amount of water than is ordinarily employed to make a pumpable paste mixture and with sand or coarse aggregate, depending upon the engineering and architectural properties desired for the finished product.

In the conventional preparation and mixing of mortar, the necessary components (cement, sand and/or aggregate, if required) are dispersed in water and mixed to form an aqueous slurry, the relative proportions having been adjusted to meet the engineering and achitectural requirements; and the amount of water which is added is adjusted to the pumping mechanism, the amount being substantially higher than that which is required for the chemical setting process. A balance must be achieved between the smaller amount of water which is needed to develop the minimum strength required in the cast slab, for example, and the minimum amount of water which makes the mortar mixture pumpable with available apparatus. There is a real problem which exists in adjusting the composition at low water content which precludes pumping transport with ordinary equipment and adds to conveying costs.

This problem is not solved by diluting the mortar with extreme amounts of water because the highly diluted mortar does not achieve the desired strength and has a longer setting, drying and curing time which adds to the cost for a poor quality product.

The present invention solves the problem of mixing cementitious concrete ingredients in pumpable form with a smaller amount of water than is conventionally used by injecting small bubbles of gas through a special valve mounted adjacent the inlet of the charging hopper by way of which the ingredients are introduced into the mixing drum and by carrying out mixing in the drum by a pressure which builds up to 3 atmospheres.

The object of the invention is to provide a method and apparatus for producing a mortar mass which can be easily pumped through pipelines in spite of its low water content and which is characterized by rapid setting, short drying time, low specific gravity and good heat insulation properties.

The invention provides a method of preparing mortar masses with increased flow properties which may be pumped through pipelines or similar devices. By applying superatmospheric gas pressure during mixing, the fluid mortar is enriched with an abundant quantity of gas bubbles intimately and uniformly distributed through the mass, and these bubbles are small in relation to the dimensions of the aggregates. Preferably, the gas pressure in the mixing drum is built up gradually from the compressed air supply by adjusting the intake valve to cause the build up for gas entrainment after the liquid and solid ingredients have been brought into the initial stages of dispersion. In this initial stage of dispersion and mixing, the water phase contains substances which reduce its surface tension, such as sulfonated fatty alcohol. This sulfonated material improves the wetting of the sand, cement and other concrete ingredients.

This initial mixing may be carried out under vacuum, if desired and the water content is kept at a relatively low level in order to achieve a fluid mass of lowered viscosity achieved by the addition of the sulfonated fatty alcohol.

The gas pressure is built up by admitting pressurized gas through the inlet valve into the pressure-type horizontal agitator drum; and, in order to prevent coalescing of the bubbles, there is preferably added gas stabilizing agents which increase the surface tension of the gasified liquid mixture and stabilize the small gas bubbles formed by pressure gasification. These bubble stabilizing agents become effective, for the most part, as soon as the pressure within the drum is released and the contents are discharged to atmospheric pressure. Increasing the pressure in the mixing drum from ambient atmospheric pressure to 3 atmospheres of pressure keeps the bubbles small as long as the mixture is first suitably liquified, the turbulence conditions are maintained during mixing and the pressure is gradually increased to prevent conditions favorable for coalescence. Preferably, the bubble stabilizer is added as soon as gasification is started and after the desired liquid condition of the slurry has been achieved.

The bubble stabilizers which may be used are higher fatty alcohols, caseins dissolved in oil and high molecular weight petroleum hydrocarbons. The bubble stabilizer may be added to a storage vessel to which the gas-entrained liquified mortar has been transferred under pressure.

The apparatus for carrying out the invention, including preferred embodiments thereof, is shown in the attached drawing in which:

FIG. 1 shows an elevational view partly in section of the gas-entraining mortar mixing apparatus of the invention fitted with mechanical agitating blades;

FIG. 1a shows a modification of mechanical mixing blades for use with the mixer of FIG. 1;

FIG. 2 shows an alternate embodiment of the gas-entraining mortar mixing apparatus in which the mixing and gasification is accomplished by a hollow vented shaft construction and mixing is aided by internally placed fins;

FIG. 3 shows a further embodiment in which gasification is accomplished through a hollow shaft stub and mixing is aided by internally placed fins; and FIG. 4 is a pressurized storage drum adapted to be used with the mixing apparatus of the invention.

In FIG. 1, there is shown a mixing drum 5 which is mounted on a base support, or which may be mounted on a vehicle if desired, and which comprises a compressed gas inlet valve 7 and a compressed gas venting valve 8 for the purpose of gasification. The hopper intake 6 for the mortar ingredients is equipped at 6a with a seal to provide pressure-tight sealing of the drum at the hopper intake when the filling process is completed.

A vibration motor 9 is mounted on the underside of the hopper to aid in supplying the mortar ingredients from the hopper into the drum 5. The shaft 10 is mounted at its ends in the necessary pressure seals 5a on pivot bearings 11. Mixing blades 14 are rigidly secured to the shaft 10 which is rotatably driven by the motor 12 and belt drive 13. The mixing blades 14 in this preferred embodiment are formed with a split and staggered vertical section so that axially remote portion of the blade, away from the shaft is displaced rearwardly of the axial blade portion, close to the shaft. The array of these blades mounted at 180 degrees to each other, as shown in FIG. 1, provides a positive force or pressure component in the portion of the drum closest to the shaft and provides a suction component (oppositely direct to the pressure component) in the volumetric portion of the drum which is swept by the axially remote blade portions, e.g. the rearwardly staggered blade portions.

Notice, in FIG. 1, the arrows at 15 which identify a circular mass flow induced by the rotating action of the blades.

FIG. 1 also shows a pressure gauge 17 for measuring the pressures prevailing in the drum 5 and a mortar outlet conduit 18 which can be sealed pressure-tight by the cock 19. The multi-sectional construction of the drum 5 is indicated by flange 20 which permits dismantling of the drum to facilitate cleaning or repair work.

In FIG. 1a, four mixing blades are grouped to form a cross 16 and several of these crosses are arranged behind each other and staggered by the same angle on the shaft 10, this being indicated by the second cross 16a and a blade of a further cross 16b.

FIG. 2 shows an alternate embodiment of the mixing drum designed as a rotary drum 21 mounted rigidly on a rotating shaft 22 of hollow construction, the rotating shaft being equipped inside with radial ducts 23. The inside wall of the drum is fitted with longitudinal fins 21a to aid in achieving a good turbulent motion. In this case, venting is effected through the hollow shaft 22 equipped with sealable inlet and outlet connections 24 and 25, which can be connected to a pressure pipe or to a vacuum pump.

FIG. 3 shows a further embodiment in which a rotary drum is rigidly mounted on rotating shaft stubs 22a and 22b, but the shaft is not of the same continuous hollow construction as shaft 22 in FIG. 2. These stubs 22a and 22b are open at the ends and, as illustrated in FIG. 2, one of the stubs 22b is provided with valve 25 and the other stub 22a is provided with valve 24. Effectively, the modification of shaft stubs in FIG. 3 provides the gasification function of the mortar mass in much the same manner as in FIG. 2, compressed gas being fed from an outside source and the stubs being provided with pressure-tight seals so that the pressure up to 3 atmospheres can be maintained. Similarly, as in the apparatus shown in FIG. 2, either of valves 24 or 25 may be fitted to a vacuum pump to permit the evacuation of the contents to about 0.5 atmosphere, which is especially desirable during the initial mixing operation because it provides for a stepwise increasing of the pressure for the control of bubble size.

It is in connection with the operation of the novel rotating drum mixers shown in FIGS. 2 and 3, operated at subatmospheric pressure in the initial mixing and gasification stages, that the advantages of the present mixing-gasification method can be more clearly understood. The mechanical mixing by the blades 14 in FIG. 1 or the cruciform blades 16 in FIG. 1a, in whatever longitudinal array they may be employed, does not constitute an essential limitation of the present method invention. In short, whether mixing is by rotating the drum, as in FIGS. 2 and 3, or rotating the blades, as in FIG. 1, the proportioning of water and the mortar ingredients, including cement, sand and aggregate, through the hopper 6 results in effectively liquified mortar mixes which are completely mixed in the initial stages.

The amount of water which is required is a minimum amount of water, far less than that which is needed to make the mortar pumpable in the pipelines fitted to atmospheric pressure mixers. Especially useful in this initial mixing stage is the addition of surface active organic agents, e.g. wetting agents, which permit more efficient wetting of the cement particles, sand grains and aggregate. By carefully adding the dry ingredients to the water and efficiently agitating the components in the pressure-tight drum, minute air bubbles can be observed at atmospheric pressure between adjacent particles of sand and other ingredients. In the absence of any further treatment, these bubbles can be entrapped and they can coalesce to fill larger spaces, or to escape and thereby produce a generally non-uniform distribution of only slightly aerated mortar.

In contrast, if the pressure is reduced to about 0.5 atmosphere, the bubbles which are formed by entrapping during this initial mixing are, within their interior confines, at a pressure which is less than atmospheric.

Thus, starting at either atmospheric or sub-atmospheric pressure, flexible bubbles can be formed by agitation and by gas entrainment occurring at such pressures wherein the interior of the bubble is at the atmospheric or sub-atmospheric pressure, which ever the case may be, and the water-laden skin surrounding the bubble is capable of being compressed by raising the pressure. In accordance with the present invention, the pressure against the bubble is increased to substantially above atmospheric pressure, preferably to 2–3 atmospheres, whereby the bubbles are compressed and function as miniature ball bearings to lubricate the solid particles dispersed in the liquified mass.

Manifestly, it is essentially in achieving a uniform distribution of minute, "ball bearing" bubbles throughout the mortar mass that sufficient gasification be accomplished to provide a widespread dispersion of minute bubbles in the liquified mortar mass before superatmospheric maximum pressure is applied to compress and stabilize the minute bubbles.

The small compressed bubbles have a comparatively high mechanical stability and resist coalescence. It appears that these bubbles expand only slightly when the pressure is relieved and do not recombine or escape towards the surface.

It is an essential feature of the method of the present invention that the bubbles be small in relation to the aggregate of the liquified mortar masses and the present process is entirely different from the known process of producing porous, large-pore concrete parts in which relatively large air bubbles are introduced into the mortar masses by means of nozzles.

In the absence of such minute air bubbles, the same composition cannot be pumped up through pipelines to the several floors of a building or over long horizontal distances.

In a preferred method variation of the invention, the turbulence and agitating movement which is created by the rotation of the drum as in FIGS. 2 and 3, or by the movement of the rotating agitator blades within the fixed drum of FIG. 1, effectively liquify the mixture of water and dry mortar ingredients, and gasification is effected simultaneously with the mixing under a partial vacuum in order to create a widespread dispersion of primary small bubbles in the mortar mass. These minute primary bubbles, smaller in size than the aggregate or sand particles, become stabilized when the pressure is increased to superatmospheric pressure up to 2–3 atmospheres. Some additional bubble formation may occur at superatmospheric pressure, but most of the bubbles are formed in the mass before the pressure is increased.

Gasification to form minute bubbles effectively introduces a much larger proportion of air into the mortar mass containing a minimum amount of water and, because the mortar mass at low water content is more pumpable due to the lubricity of these small bubbles and the use of higher pressures, there is achieved a concrete which sets much more rapidly and which cures to a lower specific gravity slab than conventional pumped concrete.

The lower specific gravity and finer bubble structure render the cast product more suitable for use as insulation and provide better setting characteristics at temperatures below freezing, especially if the entraining air is enriched with carbon dioxide which further hastens hardening of the concrete.

The method of the present invention is therefore seen to be capable of being carried out with different kinds of apparatus; but the novel apparatus of the present invention is the preferred means to effect the method since it permits precise control of bubble formation, bubble distribution, bubble stabilization and mass lubrication in a simple and positive manner to thereby provide a low cost method of pumping mortar containing a minimum amount of water.

The pressurized storage drum of FIG. 4 illustrates this economic advantage in its combination with the mixing apparatus of FIGS. 1–3, the pressure-tight drum 26 serving to store the pressurized product which is fed into the drum through mortar intake line 27. This pipe 27 can communicate with the outlet pipe, such as 18, in any one of the three mixing drum embodiments. The flow of the pressurized mortar into storage container 26 can be accelerated by evacuating the storage container through line 28 and thereafter closing valve 34 in line 28 while opening valve 33 in mortar intake line 27. Compressed gas can be led into the storage container 26 through line 28, this line now being used for pressurizing the contents rather than for evacuating the container. This pressurized gas may be used to agitate contents during storage and dispensing to the site of use. Venting line 29 is provided in the storage container head and is fitted with an adjustable excess pressure or pop valve. The head of the container is also fitted with a pressure gauge; and the conical base of the container is fitted with a pressure-tight discharge line and discharge shut-off valve 32.

The method of the present invention is not limited to the use of a horizontal drum. A vertical mixing drum can be used.

Having thus disclosed the invention what is claimed is:

1. A method of preparing gas-entrained mortar masses with increased flow properties so that said mortar can be pneumatically forced through a pipeline to the site of use, comprising: mixing the mortar components including cement, sand and aggregate with a minimum amount of water in a pressure-tight mixer drum until a uniform liquified consistency suitable for gasification is achieved; introducing a gas into the liquified mass, said gas being selected from the group consisting of air and air mixed with carbon dioxide, under pressure to form small gas bubbles which uniformly fill spaces between the sand and aggregate particles in the liquified mortar mixture; gradually increasing the gas pressure while agitating the mortar mass to compress the gas bubbles and to prevent colaescent of the gas bubbles, the gas pressure being increased up to 3 atmospheres; and discharging said gas-entrained mortar mass.

2. A method as claimed in claim 1, wherein said gas-entrained mortar mass, on discharge, is transferred to a pressure-tight storage container which is fitted with agitation means and wherein said gasified mixture is maintained in storage under gas pressure up to 3 atmospheres and is agitated when discharged from storage for use.

3. A method as claimed in claim 1, wherein the water used in making the initial mixture is provided with a surface tension reducing agent which improves the wetting of the sand, cement and aggregate components.

4. A method as claimed in claim 1, wherein during said gasification under pressure there is added a bubble stabilizing agent selected from the group consisting of higher fatty alcohols, caseins dissolved in oil and high molecular weight petroleum hydrocarbons.

5. A method as claimed in claim 2, wherein a bubble-stabilizing agent selected from the group consisting of higher fatty alcohols, caseins dissolved in oil and high molecular weight petroleum hydrocarbons is added to the mortar mixture in the storage container.

6. A method as claimed in claim 1, wherein the initial mixing of the mortar components with water takes place at sub-atmospheric pressure.

7. A method as claimed in claim 2, wherein said storage container is filled under sub-atmospheric pressure.

8. Apparatus for preparing mortar masses with increased flow properties so that said mortar can be forced through pipelines to the site of use comprising: a horizontal pressure-tight mixing drum; a feed hopper for feeding mortar components into said drum, said hopper having an intake orifice and a pressure-tight seal below said intake orifice for sealing said mixing drum after it has been filled; a valved gas inlet means for introducing gas under pressure into the liquified mortar contents in said mixing drum; a gas venting valve means for relieving excess pressure and for reducing the pressure in the drum to sub-atmospheric pressure; a motor driven central shaft mounted longitudinally in said drum; agitating means associated with said shaft within said stationary drum to maintain the mortar in a turbulent condition; and an outlet conduit for discharging gasified mortar from said drum.

9. Apparatus as claimed in claim 8, wherein said agitating means are in the form of a plurality of blades arranged in pairs and mounted on said shaft.

10. Apparatus as claimed in claim 8, wherein said agitating means are in the form of a plurality of cruciform blades in staggered relation on said shaft.

11. Apparatus as claimed in claim 8, wherein said agitating means is in the form of orifices longitudinally disposed along the extent of said shaft and wherein said shaft is hollow and is connected at an end to said valved gas inlet means to thereby introduce gas through said hollow shaft and wherein said mixing drum is further provided with fins longitudinally along the inside wall thereof, said fins aiding turbulence of the mortar during simultaneous gasification and mixing.

12. Apparatus as claimed in claim 8 wherein said central shaft is in the form of rotating shaft stubs at each end of said drum, each of said shaft stubs being hollow and one of said shaft stubs being connected to said valved gas inlet means, and wherein said mixing drum is further provided with fins longitudinally along the inside wall thereof, said fins aiding turbulence of the mortar during simultaneous gasification and mixing.

13. Apparatus as claimed in claim 8 in combination with a pressure-tight storage container, said storage container fitted with compressed gas inlet and venting valves for adjusting gas pressure in the storage container filled with gas-entrained mortar.

References Cited

UNITED STATES PATENTS

| | | | |
|---|---|---|---|
| 1,769,275 | 7/1930 | Rice | 259—147 X |
| 2,608,393 | 8/1952 | Hale | 259—151 |
| 3,006,615 | 10/1961 | Mason | 259—151 X |
| 3,194,539 | 7/1965 | Hanne-Wiame | 259—151 X |
| 3,212,759 | 10/1965 | Brown | 259—151 |

BILLY J. WILHITE, *Primary Examiner.*

R. W. JENKINS, *Assistant Examiner.*